June 7, 1949.  C. J. BORKOWSKI  2,472,365
ALPHA PARTICLE COUNTING
Filed Feb. 21, 1946
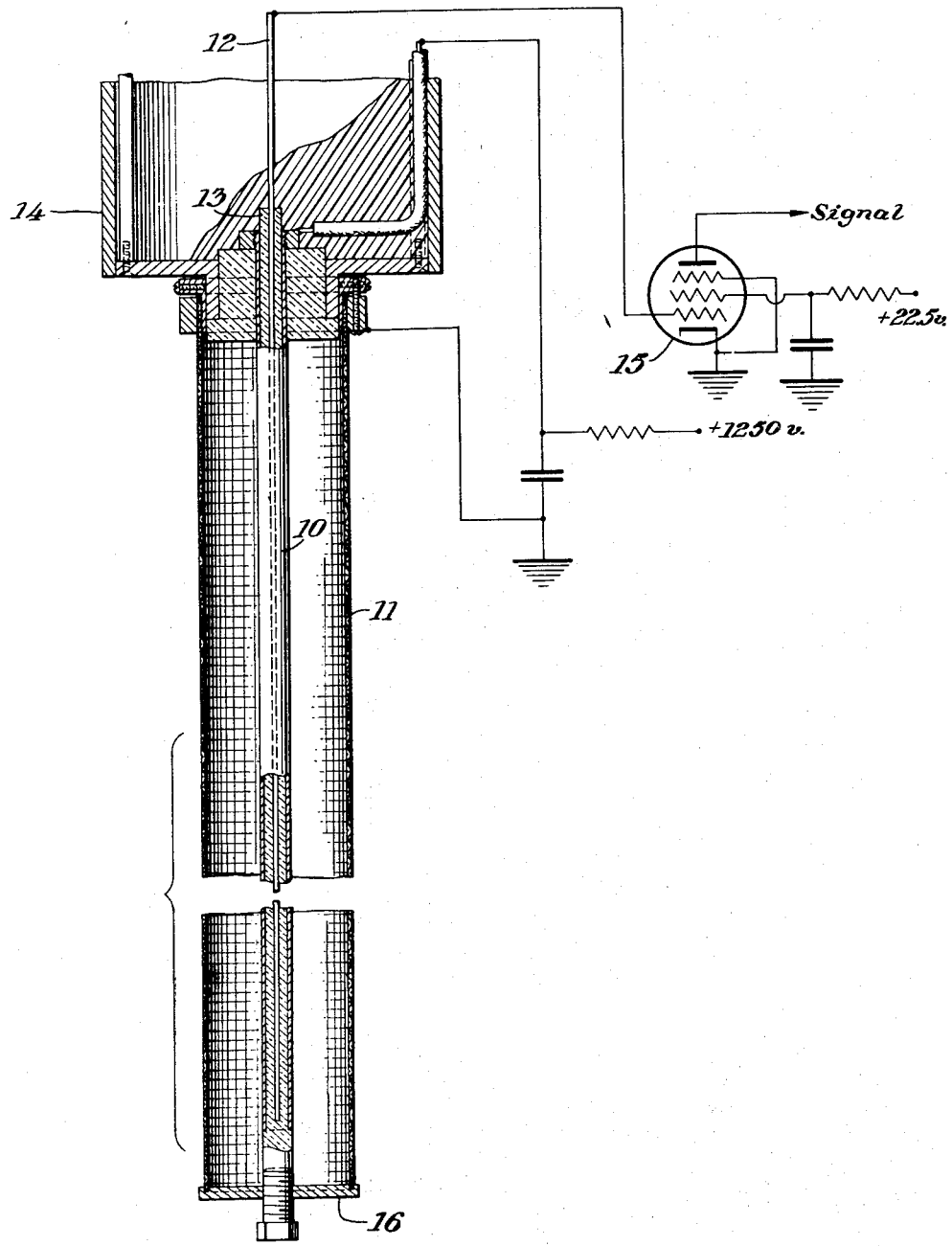
INVENTOR.
Casimer J. Borkowski.
BY
Robert A. Lavender Patented June 7, 1949

2,472,365

UNITED STATES PATENT OFFICE 2,472,365

ALPHA PARTICLE COUNTING

Casimer J. Borkowski, Oak Ridge, Tenn., assignor to the United States of America as represented by the United States Atomic Energy Commission Application February 21, 1946, Serial No. 649,405

4 Claims. (Cl. 250—83.6)

The present invention relates to apparatus responsive to radioactivity and more particularly to apparatus for measuring alpha particle emission.

In work involving radioactive materials it is frequently desirable to obtain an indication of the alpha contamination of the hands, of filter paper, of miscellaneous objects and materials, and of the atmosphere, etc.

An object of the invention is the provision of an ionization chamber having a relatively high geometry, such as over 25%, and which is convenient to use with large surfaces.

Another object of the invention is the provision of a counter which is especially convenient to use for determining contamination of the palms of hands by alpha emitting material.

Another object of the invention is the provision of an alpha counting ionization chamber in which the high voltage electrode is the collecting electrode.

Another object of the invention is to provide an ionization chamber wherein the collecting electrode is in the form of a tube having an axially aligned rod therewithin in capacitance relationship thereto, the rod being connected to an amplifier.

Other objects and advantages of the invention will be evident from the following description when read in connection with the accompanying drawing the single figure of which is a fragmentary view partly in section of a preferred embodiment of the invention.

The specific embodiment shown in the drawing to illustrate the invention comprises a hollow cylindrical high voltage electrode 10 surrounded in spaced relation by a cylindrical wide mesh screen 11 at ground potential. Coaxially of the high voltage electrode 10 is positioned a conducting rod 12 which is separated from the electrode 10 by a high dielectric insulator 13, thereby providing, in effect, a condenser between the electrode 10 and the rod 12. The assembly just described is secured by any suitable means in depending relation on a container 14 which may enclose a preamplifier tube 15 indicated schematically in the drawing to make clear one suitable connection for the counter.

With a high voltage on the electrode 10 and with an alpha emitting material such as a hand or clothing against or wrapped around the screen 11, ions formed inside the screen 11 will be collected by the electrode 10 and due to the capacitance coupling will appear as a signal on the rod 12. This signal may be fed to the grid of the preamplifier tube 15 and then further amplified or scaled as desired in any well known manner.

The counter as above described is convenient to use, provides a geometry up to 35% and no A. C. pickup from a 60 cycle supply. It will be noted that it is simple in construction and is considerably less microphonic than known previous designs of alpha survey chambers using high gain amplifiers.

Referring again to the drawing, the lower end of the apparatus is closed by a cap 16 which serves to strengthen and position the screen 11 and the insulator 13. This cap 16 may be made of screen material so that it can be used for localizing alpha activity of small areas.

While for the purpose of explaining the invention a specific embodiment has been illustrated and described, it is to be understood that the invention may take other forms without departing from the scope of the appended claims.

I claim:

1. In an ionization chamber and amplifier system for alpha particle counting, in combination, an outer tube of wire mesh having arranged concentrically therein an electrode structure comprising a coaxial rod and tube having insulating material interposed therebetween, a connector grounding said wire mesh tube, a source of relatively high voltage impressed on said coaxial tube whereby a signal current will appear in said rod as a result of ionization of air within the wire mesh tube and a connector from said rod to the amplifier.

2. In an ionization chamber and amplifier system for alpha particle counting, in combination, a tubular high voltage electrode, a cylindrical wire mesh screen arranged concentrically around the said high voltage electrode, the wire mesh screen being at ground potential and being spaced from said electrode to provide a gas volume in which ionization may take place, a potential source connected to said electrode, the said electrode forming the collector of the ionization chamber, a rod extending axially of the tubular high voltage electrode and insulated therefrom, the high voltage electrode and the rod insulatively spaced therefrom forming a condenser and a connection from the rod to the amplifier.

3. In a high geometry alpha counting chamber and amplifier system, in combination, means defining an ionizing space comprising an outer wire mesh tube having therewithin a cylindrical electrode, means arranged to impress a relatively high voltage on the inner electrode adapting it to function as a collecting electrode, a rod extending the length of the collecting electrode in a high capacitance relationship whereby electrical charges collected by the high voltage electrode produce a corresponding signal voltage in the rod and a connector from the rod to the amplifier.

4. In an ionization chamber and amplifier system for alpha particle counting, in combination, an outer cylindrical element made of electrically conductive material having arranged concentrically therein an electrode structure comprising a coaxial rod and tube spaced from each other and forming a condenser, a source of relatively high voltage impressed between said coaxial tube and said cylindrical element whereby a signal current will appear in said rod as a result of ionization of air within the said outer element and a connector from said rod to the amplifier whereby a capacity connection is made between said tube and amplifier.

CASIMER J. BORKOWSKI.

REFERENCES CITED

The following references are of record in the file of this patent:

UNITED STATES PATENTS

| Number | Name | Date |
| --- | --- | --- |
| 2,094,318 | Failla | Sept. 28, 1937 |
| 2,197,453 | Hassler | Apr. 16, 1940 |
| 2,383,477 | Friedman | Aug. 28, 1945 |

Certificate of Correction

Patent No. 2,472,365     June 7, 1949

CASIMER J. BORKOWSKI

It is hereby certified that error appears in the printed specification of the above numbered patent requiring correction as follows:

Column 2, line 55, after the word "extending" insert *along* ;

and that the said Letters Patent should be read with this correction therein that the same may conform to the record of the case in the Patent Office.

Signed and sealed this 2nd day of May, A. D. 1950.

[SEAL]

THOMAS F. MURPHY,
*Assistant Commissioner of Patents.*